(12) United States Patent
Collins, III et al.

(10) Patent No.: US 11,760,466 B2
(45) Date of Patent: Sep. 19, 2023

(54) UNMANNED AERIAL VEHICLE WITH SENSOR SUITE

(71) Applicant: The Boeing Company, Chicago, IL (US)

(72) Inventors: Lathan Hunter Collins, III, Toney, AL (US); Ryan Douglas Jones, Chesterfield, MO (US); Rachael Dawn Morelli, St. Peters, MO (US); Andrew George Laquer, Tustin, CA (US); Mark Andrew Lundgren, Fountain Hills, AZ (US); Joshua Robert Laub, Madison, AL (US)

(73) Assignee: THE BOEING COMPANY, Arlington, VA (US)

( * ) Notice: Subject to any disclaimer, the term of this patent is extended or adjusted under 35 U.S.C. 154(b) by 112 days.

(21) Appl. No.: 17/456,450

(22) Filed: Nov. 24, 2021

(65) Prior Publication Data
US 2022/0194551 A1 Jun. 23, 2022

Related U.S. Application Data

(60) Provisional application No. 63/130,293, filed on Dec. 23, 2020.

(51) Int. Cl.
| | | |
|---|---|---|
| *B64C 3/56* | (2006.01) |
| *B64C 39/02* | (2023.01) |
| *B64U 30/12* | (2023.01) |
| *B64U 50/15* | (2023.01) |
| *B64U 10/25* | (2023.01) |
| *B64U 101/00* | (2023.01) |
| *B64U 101/30* | (2023.01) |
| *B64U 101/35* | (2023.01) |

(52) U.S. Cl.
CPC .............. *B64C 3/56* (2013.01); *B64C 39/024* (2013.01); *B64U 10/25* (2023.01); *B64U 30/12* (2023.01); *B64U 50/15* (2023.01); *B64U 2101/00* (2023.01); *B64U 2101/30* (2023.01); *B64U 2101/35* (2023.01); *B64U 2201/20* (2023.01)

(58) Field of Classification Search
CPC ............ B64C 3/56; B64U 50/15; B64U 30/12
See application file for complete search history.

(56) References Cited

FOREIGN PATENT DOCUMENTS

GB 2414860 A * 12/2005 ........... F41G 7/2246

* cited by examiner

*Primary Examiner* — Nicholas McFall
(74) *Attorney, Agent, or Firm* — Alleman Hall Creasman & Tuttle LLP

(57) ABSTRACT

An unmanned aerial vehicle is provided, including an airframe including a fuselage and at least one stowable wing. The unmanned aerial vehicle can further include a radar panel positioned on the fuselage such that the radar panel is angled downward and extends longitudinally along a ventral region of the fuselage. The unmanned aerial vehicle can further include a drop-away rocket engine that is configured to detachably mount to the airframe adjacent the radar panel.

20 Claims, 10 Drawing Sheets

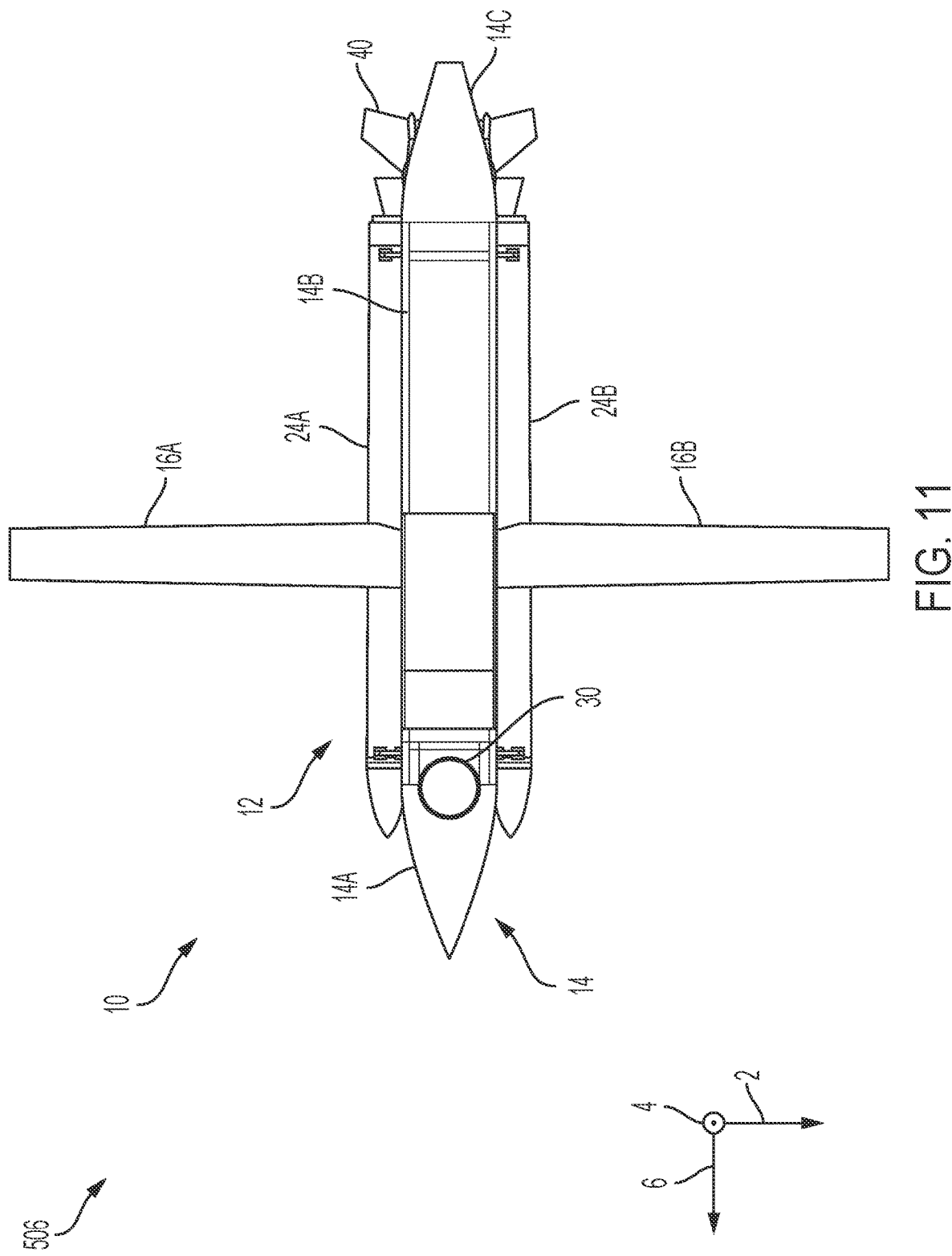

UNMANNED AERIAL VEHICLE WITH SENSOR SUITE

CROSS REFERENCE TO RELATED APPLICATIONS

This application claims priority to U.S. Patent Application Ser. No. 63/130,293, filed Dec. 23, 2020, the entirety of which is hereby incorporated herein by reference for all purposes.

FIELD

The disclosure provided herein pertains to the field of unmanned aerial vehicles.

SUMMARY

According to one aspect of the present disclosure, an unmanned aerial vehicle is provided, including an airframe including a fuselage and at least one stowable wing. The unmanned aerial vehicle further includes a sensor, e.g., radar panel, positioned on the fuselage such that the sensor is angled downward and extends longitudinally along a ventral region of the fuselage. The unmanned aerial vehicle further includes a drop-away rocket engine that is configured to detachably mount to the airframe adjacent the radar panel.

BRIEF DESCRIPTION OF THE DRAWINGS

FIG. 11 shows a top-down view of the example unmanned aerial vehicle of FIG. 1.

DETAILED DESCRIPTION

The description of an unmanned aerial vehicle provided below refers to a horizontal (left-right) direction 2, a vertical (up-down) direction 4, and a depth (fore-aft) direction 6. In addition, the description provided below refers to a dorsal region and a ventral region of the unmanned aerial vehicle. These directions are defined in a perspective facing from a tail of the unmanned aerial vehicle toward a nose of the unmanned aerial vehicle. The depth direction can alternatively be referred to as the longitudinal direction, and the horizontal direction can alternatively be referred to as the lateral direction.

Figure 1:
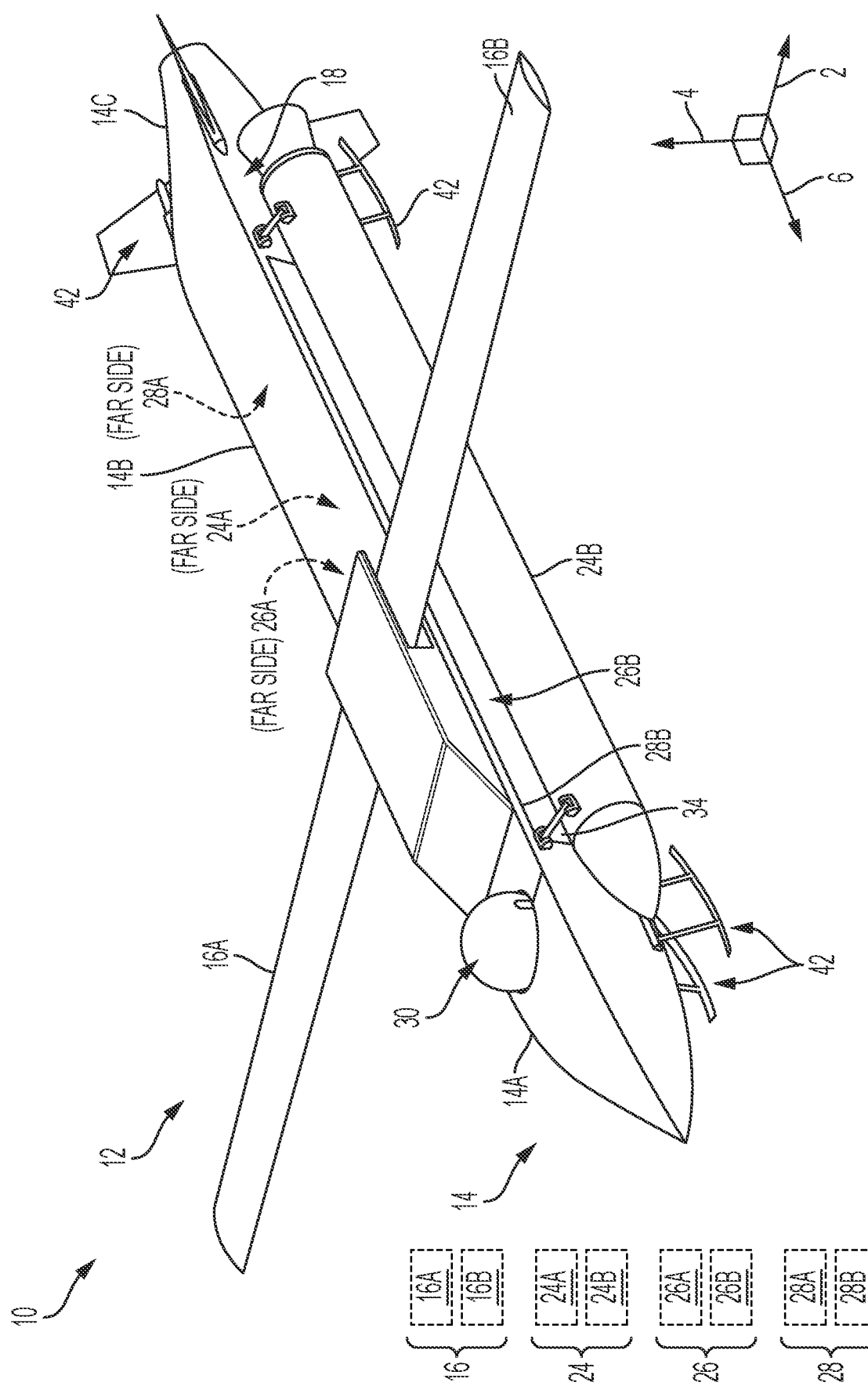
FIG. 1 shows an unmanned aerial vehicle including a radar panel, according to one example embodiment.

FIG. 1 shows an unmanned aerial vehicle 10 according to one example embodiment. The unmanned aerial vehicle 10 of FIG. 1 includes an airframe 12, which includes a fuselage 14. The airframe 12 of the unmanned aerial vehicle 10 may further include an engine 18, fuel 20, and a refueling inlet 22 provided within the fuselage 14, as discussed in further detail below with reference to FIG. 2. In addition, the airframe 12 may further include at least one stowable wing 16. As used herein wing stowability refers to the wing being transitionable between a configuration for airborne flight and a stowed confirmation for launch under the power of one or more rocket engines. The stowed configuration can be external to the fuselage 14. In the example of FIG. 1, the airframe includes two foldable wings (a right foldable wing 16A and a left foldable wing 16B) that can be configured to fold toward the aft of the unmanned aerial vehicle 10 during launch. The foldable wings, as well as wing control electronics configured to fold and unfold the foldable wings, can be provided on a dorsal region of the fuselage 14.

As shown in the example of FIG. 1, the unmanned aerial vehicle 10 can further include a radar panel 26 positioned on the fuselage 14 such that the radar panel 26 is angled downward. The radar panel 26 can extend longitudinally along a ventral region of the fuselage 14. Alternatively, the radar panel 26 can be provided within a hole formed in the fuselage 14. In some examples, as shown in FIG. 1, the radar panel 26 can extend longitudinally from a location in front of the at least one stowable wing 16, through a location under the at least one stowable wing 16, to a location aft of the at least one stowable wing 16, when the at least one stowable wing 16 is deployed.

The radar panel 26 can be mounted on a substantially planar section 28 of the fuselage. In some examples, the radar panel 26 can be a right radar panel 26A, and the unmanned aerial vehicle can further include a left radar panel 26B that is symmetrically positioned on the fuselage 14. Thus, the fuselage 14 can have bilateral symmetry between the left radar panel 26B and the right radar panel 26A. The right radar panel 26A can be positioned on a right side of the fuselage 14 such that the right radar panel 26A is substantially parallel to a longitudinal axis (the fore-aft axis) of the fuselage 14. Accordingly, the right radar panel 26A can have a normal axis that is angled downward relative to horizontal and extends longitudinally from a location in front of the right wing 16A, through a location under the right wing 16A, to a location aft of the right wing 16A, when the right wing 16A is deployed. Similarly, the left radar panel 26B can be positioned on a left side of the fuselage 14 such that the left radar panel 26B is substantially parallel to the longitudinal axis of the fuselage 14. The left radar panel 26B can have a normal axis that is angled downward relative to horizontal and extends longitudinally from a location in front of the left wing 16B, through a location under the left wing 16B, to a location aft of the left wing 16B, when the left wing 16B is deployed. The left radar panel 26B and the right radar panel 26A can be angled downward to face toward the horizon when the unmanned aerial vehicle 10 is traveling at its operating altitude, as discussed in further detail below. Thus, using the radar panel 26, the unmanned aerial vehicle 10 can be configured to detect and track objects located below its operating altitude, including objects located at or near the horizon.

Each radar panel 26 included in the unmanned aerial vehicle 10 can be an active electronically steered array (AESA). In examples in which the radar panel 26 is an AESA, the radar panel 26 can include a plurality of pixels that each include a respective transmitter and a respective receiver. A sensing direction of the AESA can be steered, for example, by up to ±60° relative to an axis orthogonal to the surface of the radar panel 26. Each radar panel 26 can be configured to transmit and receive X band microwave radio signals, which can have frequencies within a range from 8.0 to 12.0 GHz.

Figure 2:
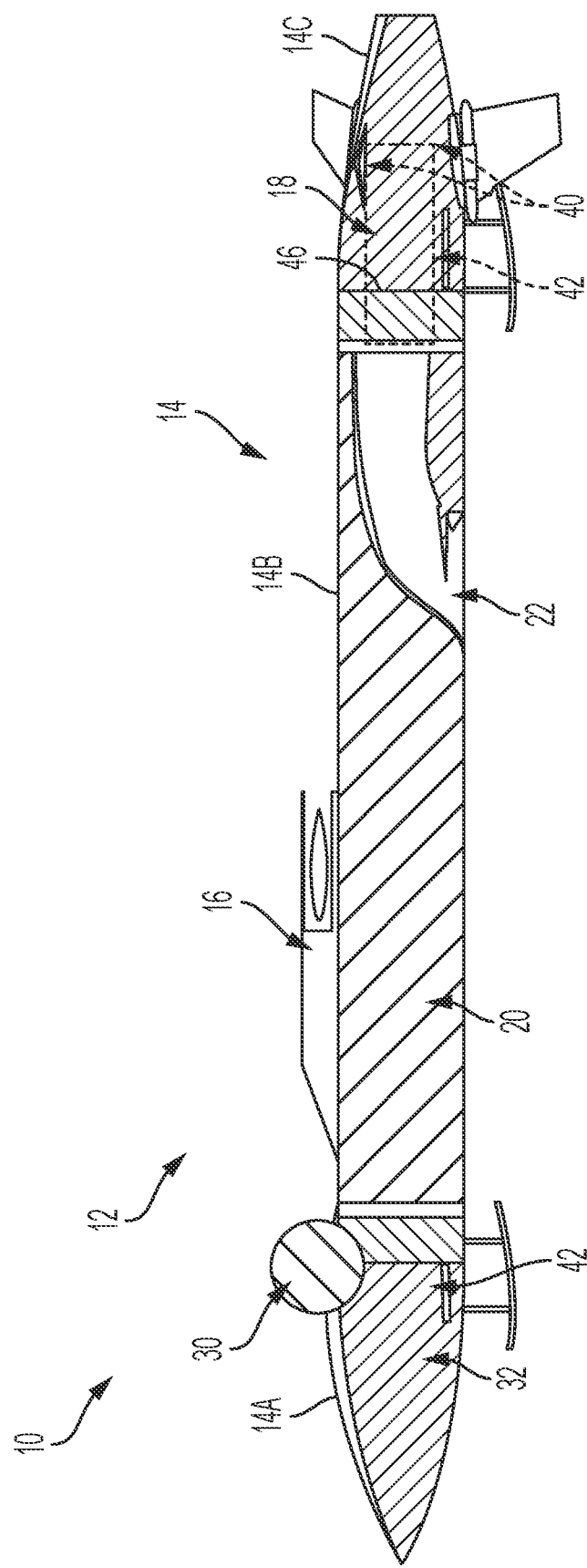
FIG. 2 shows a vertical cross section, taken perpendicular to the horizontal direction, of the example unmanned aerial vehicle of FIG. 1.
Figure 3:
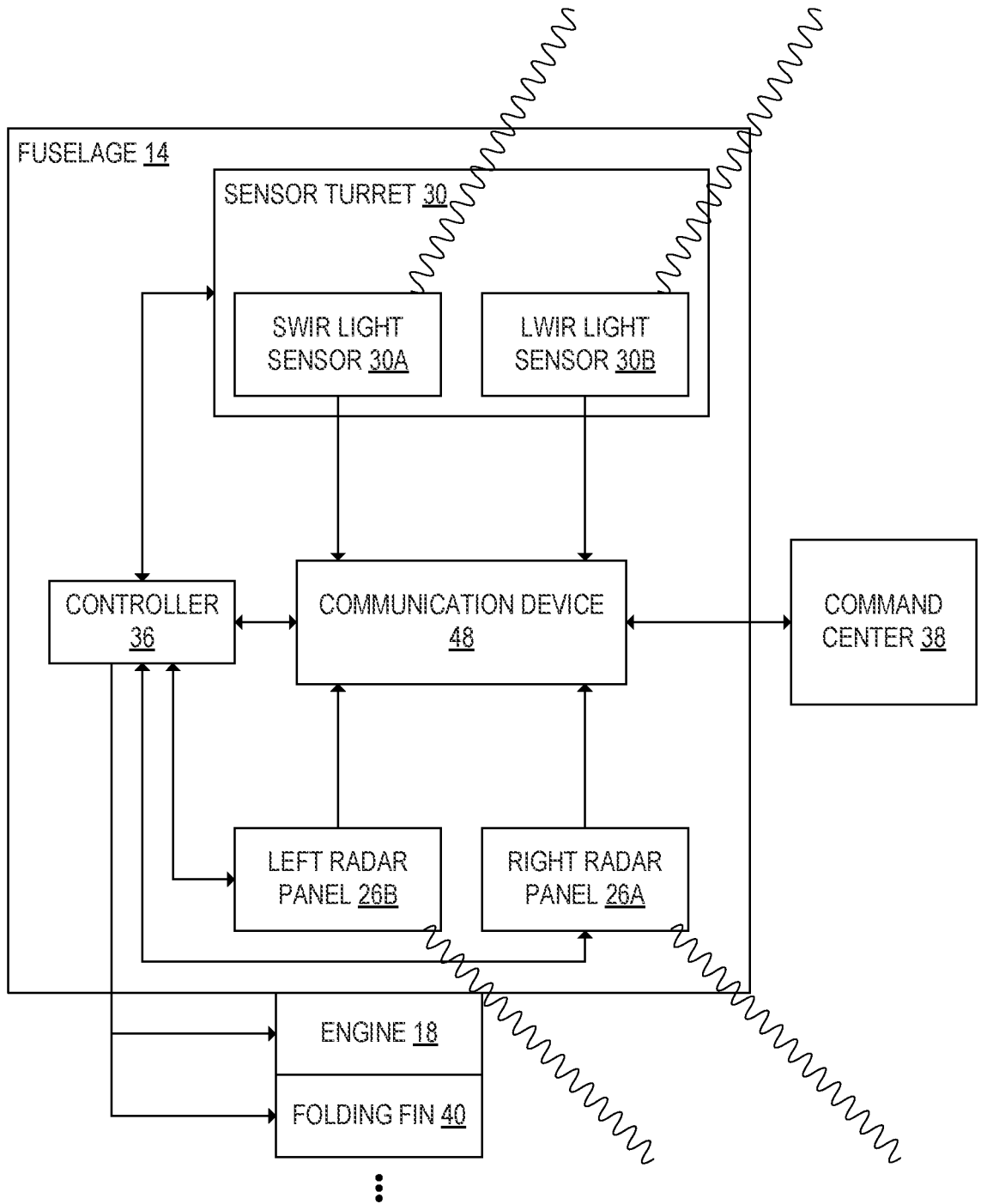
FIG. 3 schematically shows radar sensors included in the fuselage of the unmanned aerial vehicle of FIG. 1.

The unmanned aerial vehicle 10 can further include a sensor turret 30 mounted on an upper side of the fuselage 14. In the example of FIG. 1, the sensor turret 30 is located proximate to the nose of the unmanned aerial vehicle. The sensor turret can include a shortwave infrared (SWIR) light sensor 30A and can additionally or alternatively include a long wave infrared (LWIR) light sensor 30B, as shown in FIG. 3. The sensor turret 30 can be configured to rotate. Electrical power can be supplied to the sensor turret 30 by a generator 32 located in the airframe 12, as shown in FIG. 2. Thus, via the sensor turret 30, the unmanned aerial vehicle 10 can be configured to detect and track objects located above its operating altitude.

The sensor turret 30 can include other sensor types such as electro-optical infrared (EO/IR), optical cameras, and the like.

The unmanned aerial vehicle 10 can further include a drop-away rocket engine 24 that is configured to detachably mount to the airframe 12 adjacent a radar panel 26. Although FIG. 1 shows the drop-away rocket engine 24 mounted to the airframe 12 adjacent to the left radar panel 26B, the drop-away rocket engine 24 can alternatively be mounted adjacent to the right radar panel 26A. In some examples, the drop-away rocket engine 24 can be a first drop-away rocket engine 24A, and the unmanned aerial vehicle 10 can further include a second drop-away rocket 24B engine that is configured to detachably mount to the airframe 12 in a symmetrical location to the first drop-away rocket engine 24A, adjacent to a second radar panel. Thus, respective drop-away rocket engines 24 can be located proximate to both the left radar panel 26B and the right radar panel 26A in some examples. For each drop-away rocket engine 24 included in the unmanned aerial vehicle 10, respective rocket engine mounts 34 can be provided on the fuselage fore and aft of the radar panel 26, for detachably mounting the drop-away rocket engine 24.

Other configurations are contemplated in which the rockets are not separable. Other configurations are contemplated in which or in place of the rockets, other storage devices are attached, for example external fuel.

The drop-away rocket engine 24 can be configured to provide thrust during launch to launch the unmanned aerial vehicle 10, and is typically of a hybrid propellant rocket design that uses a solid fuel and a liquid or gas fuel to enable variable and controllable thrust to be applied. When the unmanned aerial vehicle 10 is launched, the stowable wing 16 can be stowed, so as not to interfere with lift-off under rocket-propelled thrust. The drop-away rocket engine 24 can be further configured to separate from the fuselage 14 at a threshold altitude.

Figure 4:
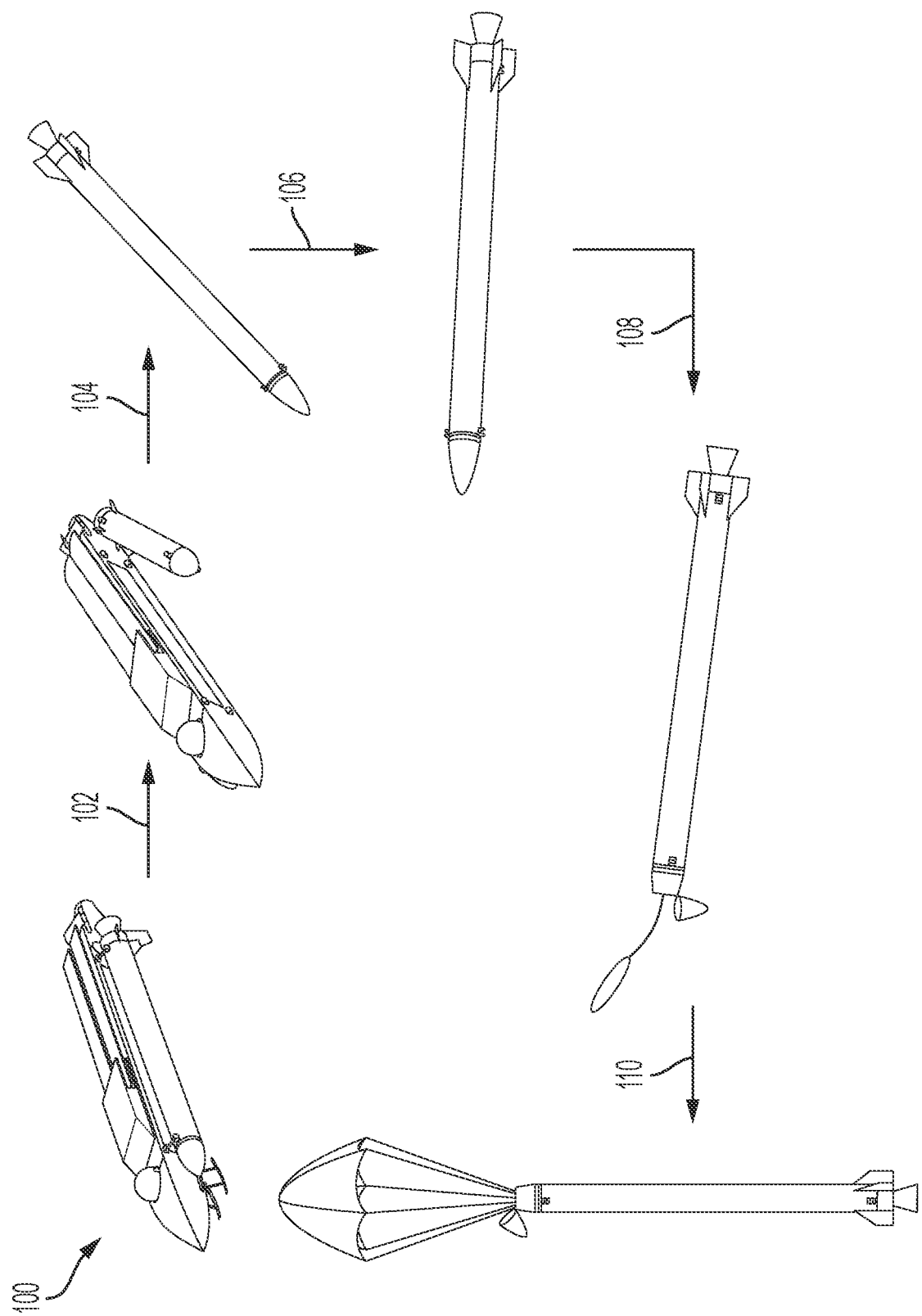
FIG. 4 shows an example retrieval sequence for a drop-away rocket engine included in the unmanned aerial vehicle, according to the example of FIG. 1.

The drop-away rocket engine 24 can be equipped with a parachute or return thrusters, which may be actuated to control descent, as discussed in further detail below with reference to FIG. 4. The unmanned aerial vehicle 10 can be further configured to deploy the at least one stowable wing 16 to a deployed configuration after separation of the drop-away rocket engine 24. Subsequently to deploying the at least one stowable wing 16, the unmanned aerial vehicle 10 can be further configured to fly along a designated route at an operating altitude.

The designated route can be a route specified in memory included in an onboard controller 36 of the unmanned aerial vehicle 10. In other examples, the route can be commanded in real time via a command center 38. In some examples, an indication of some or all of the designated route can be received at the unmanned aerial vehicle 10 as a signal transmitted from the command center 38.

As shown in FIG. 1, when drop-away rocket engine 24 is mounted, a field of view of the radar panel 26 can be at least partially blocked. When the drop-away rocket engine 24 is jettisoned, the field of view of the radar panel 26 can be cleared. In examples in which the unmanned aerial vehicle 10 includes two radar panels 26 and two drop-away rocket engines 24, the fields of view of the two radar panels 26 can both be at least partially blocked when drop-away rocket engines 24 are mounted, and the fields of view of the two radar panels 26 can both be cleared when the drop-away rocket engines 24 separate from the fuselage 14.

The unmanned aerial vehicle 10 can further include a plurality of folding fins 40 positioned in an aft section of the fuselage 14. The plurality of folding fins 40 can be configured to remain folded during launch, thereby reducing drag on the unmanned aerial vehicle 10. The plurality of folding fins 40 can be further configured to unfold when the unmanned aerial vehicle 10 is at or near its operating height in order to stabilize and steer the unmanned aerial vehicle 10 during operation. The folding fins 40 may also be folded during transport and storage (e.g., on the ground).

The unmanned aerial vehicle 10 can further include deployable landing skids 42 respectively positioned on a forward section of the fuselage 14 and in the aft section of the fuselage 14. For example, the deployable landing skids 42 can be spring-loaded. The deployable landing skids 42 can remain retracted during launch and operation of the unmanned aerial vehicle 10 and can be deployed during landing.

Thus, in the example of FIG. 1, the fuselage 14 includes, longitudinally in this order: a front section including a nose, a middle section, and an aft section including a plurality of folding fins 40. Respective landing skids 42 can also be located at the front section and the aft section of the fuselage 14. A lateral cross section of the middle section, taken perpendicular to the fore-aft direction, may have a perimeter defined by right and left substantially planar sides 28A and 28B that are oriented downwardly at symmetrical angles of declination. The right and left substantially planar sides 28A and 28B can also be connected at respective top ends by a top side and at respective bottom ends by a bottom side. The right radar panel 26A can be positioned on the right substantially planar side 28A of the middle section and the left radar panel 26B can be positioned on the left substantially planar side 28B of the middle section.

FIG. 2 shows a vertical cross section, taken perpendicular to the horizontal direction 2, of the example unmanned aerial vehicle 10 of FIG. 1. As shown in the example of FIG. 2, the sensor turret 30 and the generator 32 for the sensor turret 30 can be provided in the front section of the fuselage 14. Fuel 20, a refueling inlet 22, and fuel pumps and routings 44 can be provided in the middle section of the fuselage 14. The engine 18 can be included in the aft section of the fuselage 14. In addition, the aft section of the fuselage 14 can include a fuel nozzle 46 configured to convey fuel 20 from the middle section of the fuselage to the engine 18.

FIG. 3 schematically shows the radar sensors included in the fuselage 14 of the unmanned aerial vehicle 10 of FIG. 1. As discussed above, the unmanned aerial vehicle 10 can include a left radar panel 26B, a right radar panel 26A, and a sensor turret 30. The sensor turret can include an SWIR light sensor 30A and/or an LWIR light sensor 30B. The left radar panel 26B, the right radar panel 26A, and the sensor turret 30 can be configured to convey measurement signals to a communication device 48, via which the unmanned aerial vehicle 10 can be configured to communicate the measurement signals to a command center 38 located outside the unmanned aerial vehicle 10. The command center 38 can, for example, be a ground-based station or another aircraft.

The unmanned aerial vehicle 10 can further include a controller 36, which can, for example, include a processor and memory. The controller 36 can be configured to receive signals from the command center 38 via the communication device 48. The controller 36 can be further configured to implement control logic to provide control signals to one or more controllable components of the unmanned aerial vehicle 10 based on the signals received from the command center 38. For example, a control signal can be a signal provided to the engine 18 or the folding fins 40 to control the course of the unmanned aerial vehicle 10. As further examples, the controller 36 can be further configured to transmit a control signal to the sensor turret that causes the sensor turret to rotate, or a signal to a radar panel 26 that modifies a sensing angle of that radar panel 26. The control signals output by the controller 36 can also be based at least in part on the measurement signals received from the left radar panel 26B, the right radar panel 26A, the sensor turret 30, and/or any other sensors included in the unmanned aerial vehicle 10. In some examples, the controller 36 can be further configured to perform processing on the measurement signals before the measurement signals are transmitted to the command center 38.

In some examples, the drop-away rocket engine 24 can be configured to be reusable. FIG. 4 shows an example retrieval sequence 100 for the drop-away rocket engine 24. For example, at the end of launch, the drop-away rocket engine 24 separates from the unmanned aerial vehicle 10 at step 102 of the retrieval sequence and begins descent toward a designated landing zone at step 104. The trajectory of the drop-away rocket engine 24 during the descent can be controlled by a controller 36 coupled to actuators provided on fins of the drop-away rocket engine 24. The controller 36 can, for example, include a processor and memory, and can be configured to receive position data from a global positioning system (GPS) sensor.

When the drop-away rocket engine 24 approaches the designated landing zone, the controller 36 can, at step 106, control the drop-away rocket engine 24 to perform a pull-up maneuver that elevates the nose of the drop-away rocket engine 24 relative to the tail. The drop-away rocket engine 24 can, at step 108, be further configured to deploy a parachute, and, at step 110, fall slowly into the designated landing zone. The drop-away rocket engine 24 can then be recovered for reuse.

Figure 5:
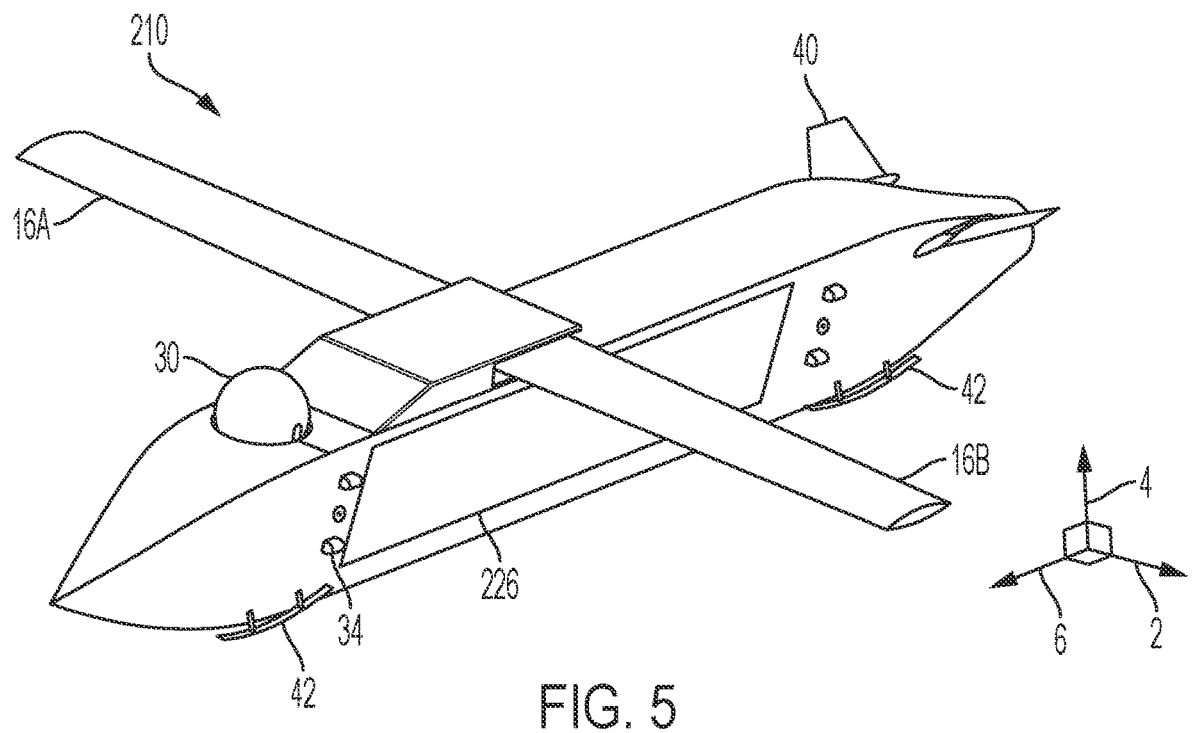
FIGS. 5 and 6 show example alternative configurations of an unmanned aerial vehicle including a radar panel.

FIG. 5 shows another example configuration of an unmanned aerial vehicle 210. In the example of FIG. 5, the radar panels 226 provided on the unmanned aerial vehicle 210 are wider than in the example of FIG. 1. As a result of the increase in the width of the radar panels 226, the strength and reliability of the signals received by the radar panels 226 can be increased, at the cost of increasing the size and weight of the unmanned aerial vehicle 210.

In other embodiments, other configurations are possible. For example, the radar panels 226 in FIG. 5 are shown oriented such that a face of the panel faces partially downward towards a bottom of the vehicle (e.g., pointed to the ground). In other embodiments, the face of the panel faces substantially vertically (e.g., pointed to the air or horizon).

Figure 6:
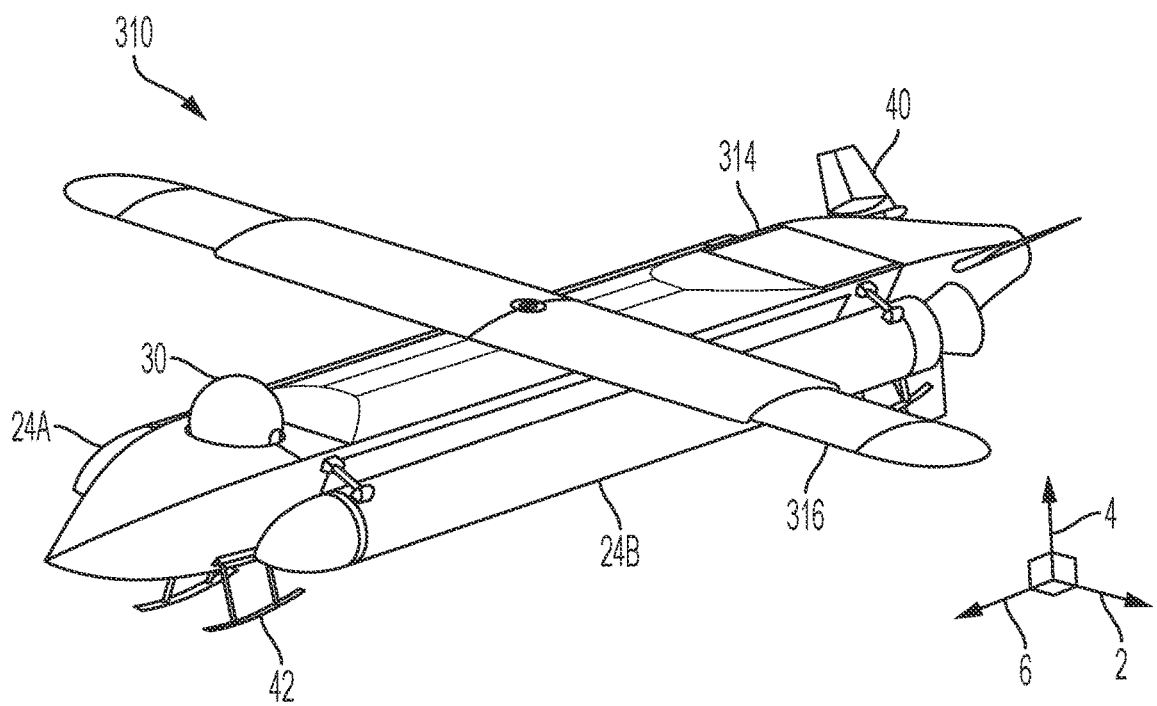

FIG. 6 shows another example configuration of an unmanned aerial vehicle 310. In the example of FIG. 6, rather than including two foldable wings, the unmanned aerial vehicle 310 includes a scissor wing 316. The scissor wing 316 can be configured to rotate around a pivot point located on the dorsal surface of the fuselage 314. The scissor wing 316 can be kept substantially parallel to the fuselage 314 during launch and can unfold to be substantially perpendicular to the fuselage 314 after the unmanned aerial vehicle 310 is launched.

In other examples, the unmanned aerial vehicle can include retractable wings configured to retract into a wing stowing volume provided in the fuselage. The unmanned aerial vehicle can include a left retractable wing and a right retractable wing in such examples. The retractable wings can, for example, be collapsible wings configured to remain collapsed within the wing stowing volume during launch. In such examples, the retractable wings can be further configured to expand in a horizontal direction from their collapsed state after the unmanned aerial vehicle is launched.

Figure 7:
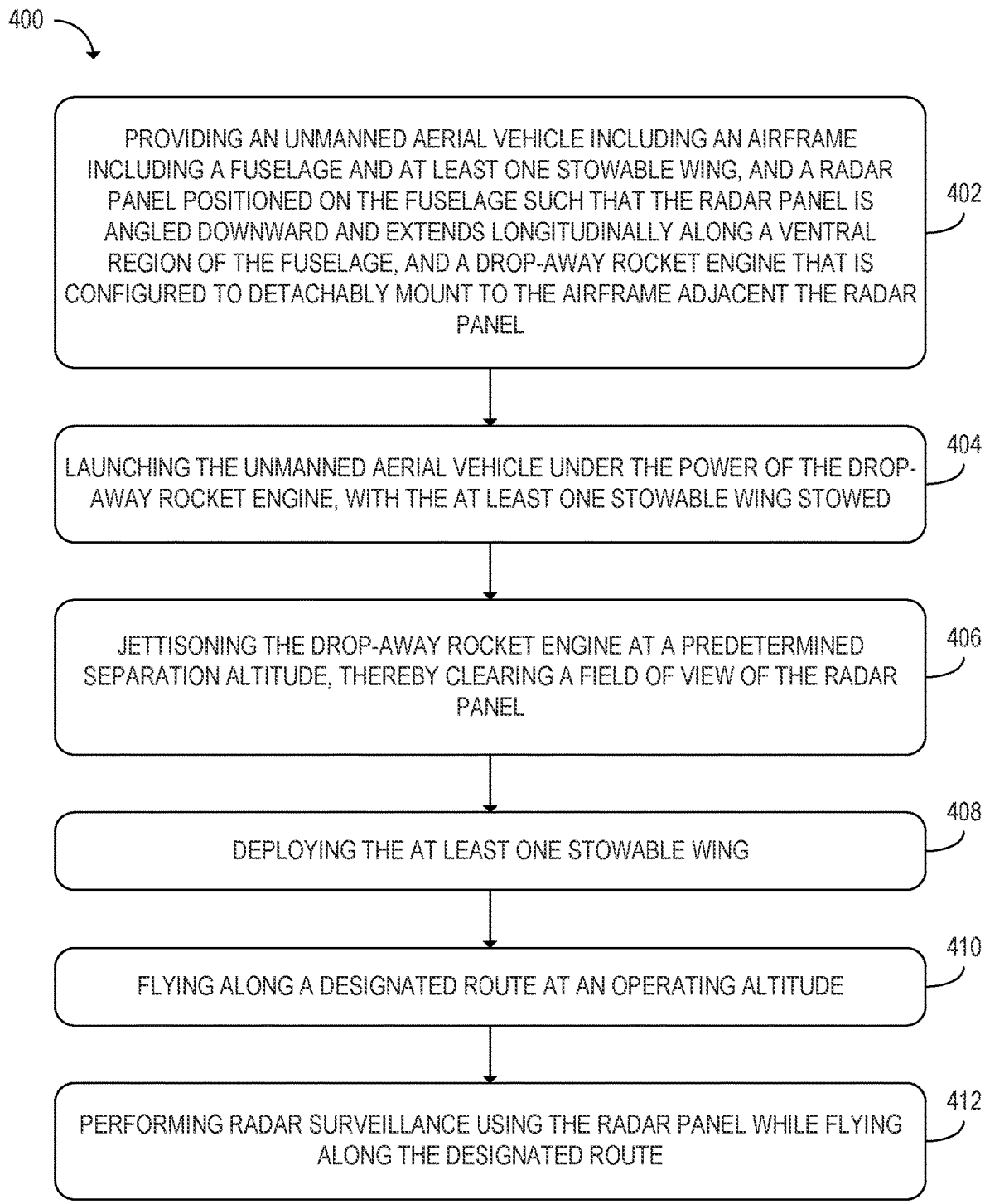
FIG. 7 shows a flowchart of an example method for conducting aerial surveillance using an unmanned aerial vehicle, according to the example of FIG. 1.

Turning now to FIG. 7, a flowchart of an example method 400 for conducting aerial surveillance is provided. The method 400 can include, at step 402, providing an unmanned aerial vehicle including an airframe. The airframe can include a fuselage and at least one stowable wing. The unmanned aerial vehicle can further include a radar panel positioned on the fuselage such that the radar panel is angled downward and extends longitudinally along a ventral region of the fuselage. In some examples, the unmanned aerial vehicle can include a left radar panel and a right radar panel that are symmetrically positioned on the fuselage. In addition, the unmanned aerial vehicle can further include a sensor turret mounted on an upper side of the fuselage. For example, the sensor turret can include an SWIR light sensor and/or an LWIR light sensor. The unmanned aerial vehicle can further include a drop-away rocket engine that is configured to detachably mount to the airframe adjacent the radar panel. In some examples, the unmanned aerial vehicle can include a first drop-away rocket engine and a second drop-away rocket engine, which can be located on the left and right sides of the fuselage.

The method 400 can further include, at step 404, launching the unmanned aerial vehicle under the power of the drop-away rocket engine, with the at least one stowable wing stowed. In examples in which the at least one stowable wing includes a pair of foldable wings, the foldable wings can be folded to be substantially parallel to the fuselage. In examples in which the at least one stowable wing is a scissor wing, the scissor wing can be rotated such that it is substantially parallel to the fuselage. In examples in which the at least one stowable wing includes a pair of retractable wings, the retractable wings can be retracted into a wing stowing volume.

The method 400 can further include, at step 406, jettisoning the drop-away rocket engine at a predetermined separation altitude, thereby clearing a field of view of the radar panel. In examples in which the unmanned aerial vehicle includes two radar panels and two drop-away rocket engines, both drop-away rocket engines can be jettisoned and both radar panels can be uncovered.

The method 400 can further include, at step 408, deploying the at least one stowable wing. For example, the stowable wing can be deployed when the unmanned aerial vehicle is at or near the operating altitude. At step 410, the method 400 can further include flying along a designated route at an operating altitude. The designated route can be a route specified in memory included in a controller provided in the unmanned aerial vehicle. In some examples, an indication at least a portion of the designated route can be transmitted to the unmanned aerial vehicle from a command center. The method 400 can further include, at step 412, performing radar surveillance using the radar panel while flying along the designated route. In examples in which the unmanned aerial vehicle further includes a sensor turret, radar surveillance can also be performed using the sensor turret. Thus, in such examples, radar sensing can be performed for areas both above and below the unmanned aerial vehicle.

Figure 8:
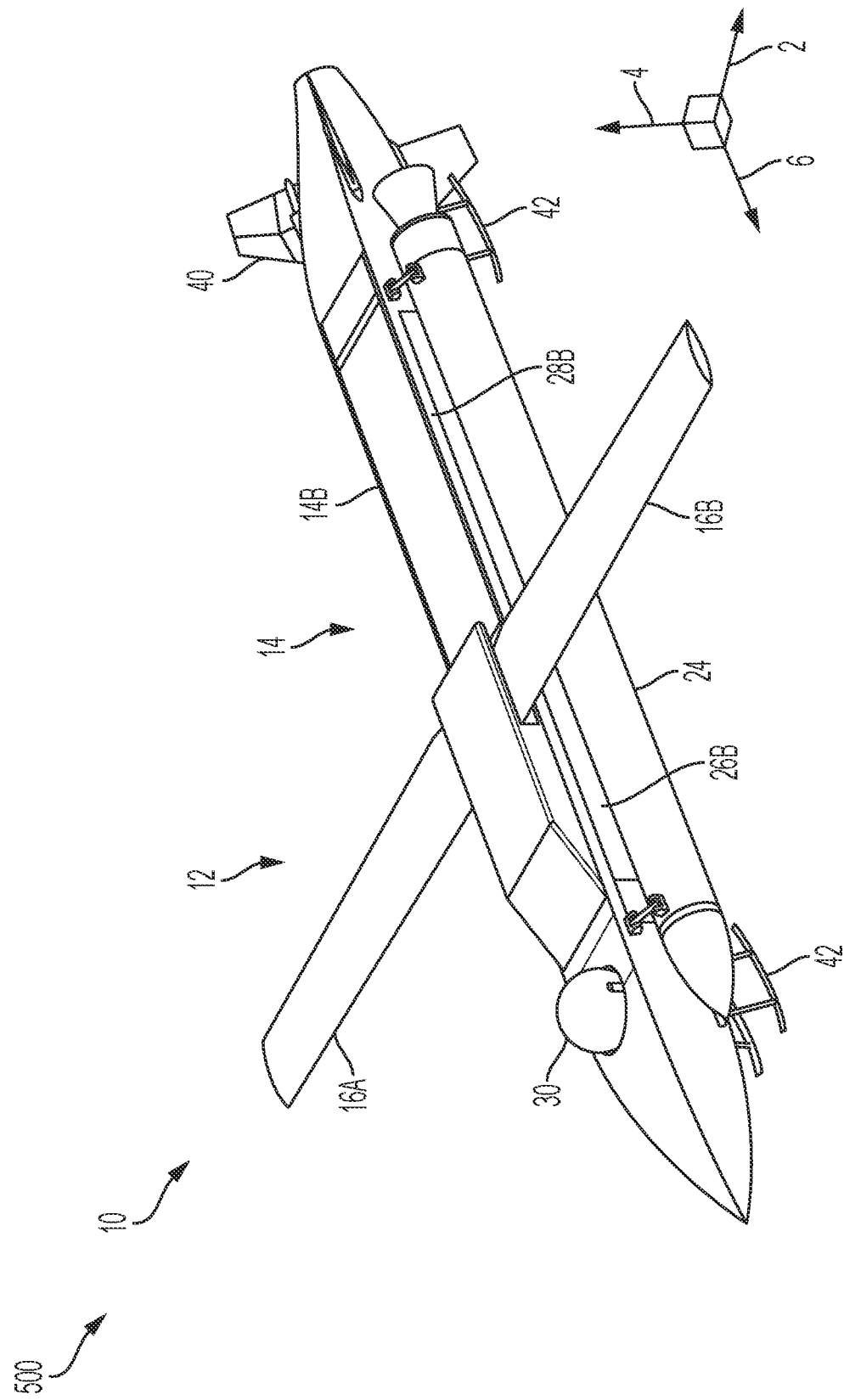
FIG. 8 shows a segmented perspective view of the example unmanned aerial vehicle of FIG. 1.
Figure 9:
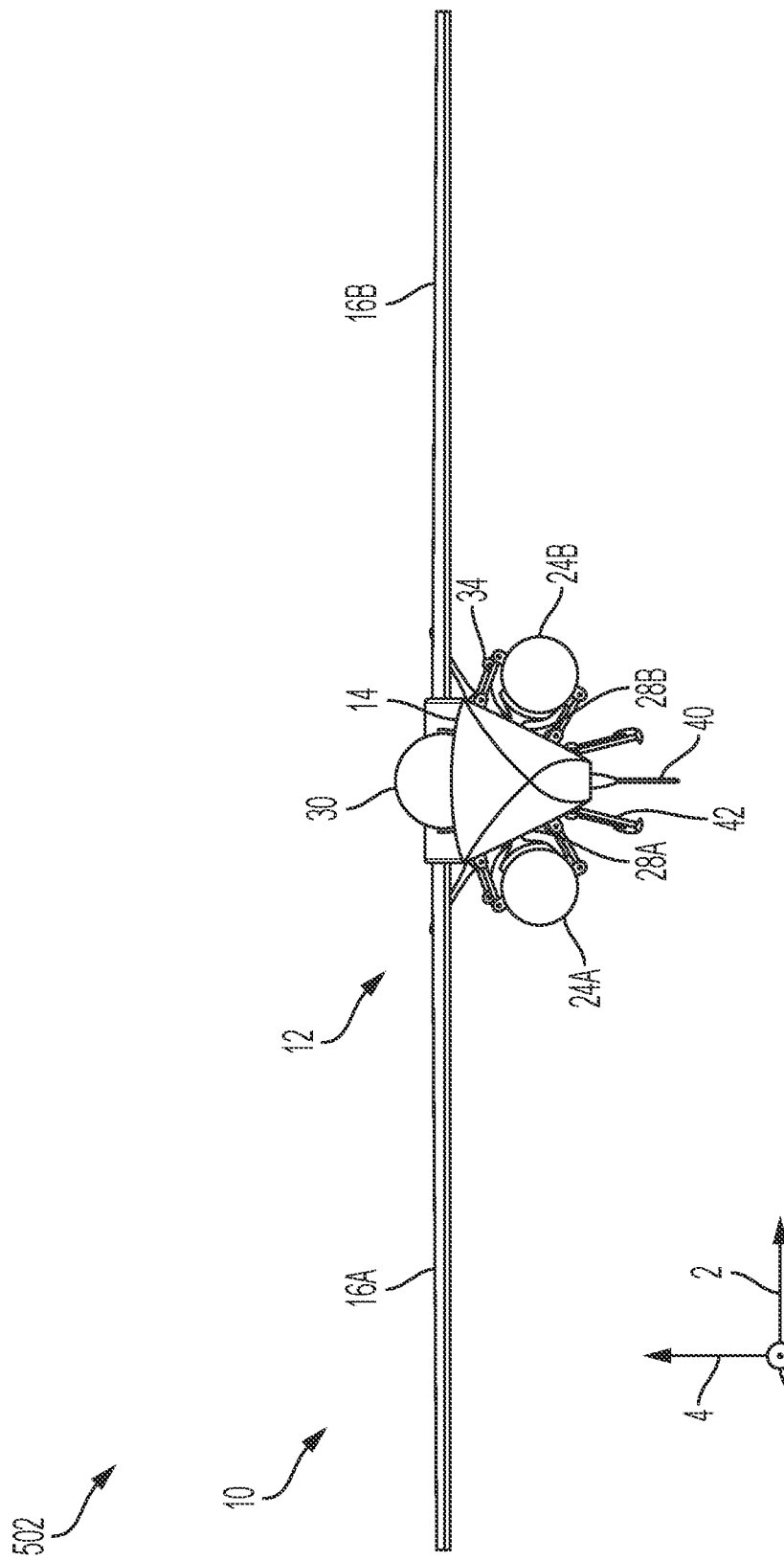
FIG. 9 shows a front view of the example unmanned aerial vehicle of FIG. 1.
Figure 10:
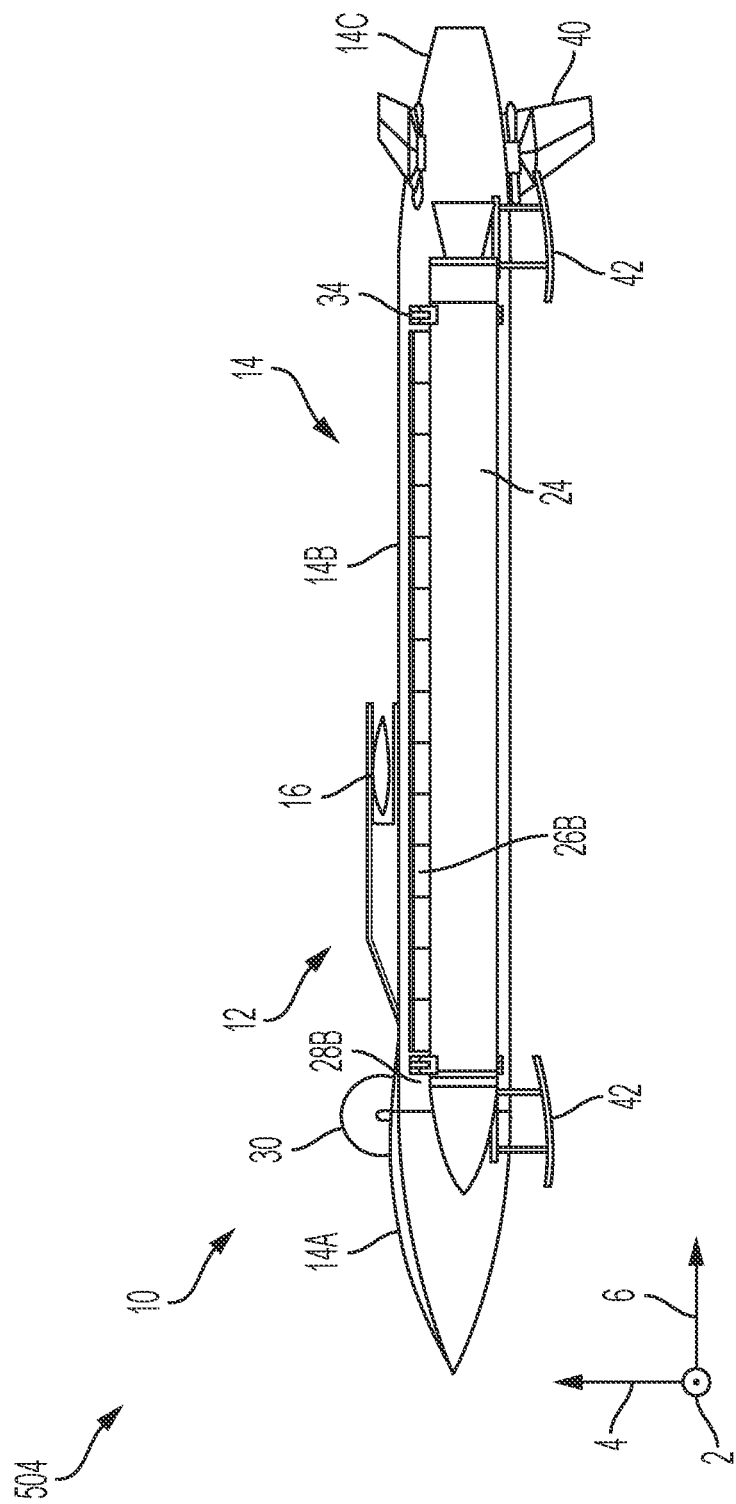
FIG. 10 shows a left side view of the example unmanned aerial vehicle of FIG. 1, the right side being a substantial mirror image of the left.

Additional views of the unmanned aerial vehicle 10 of FIG. 1 are shown in FIGS. 8-11. FIG. 8 is a segmented perspective view 500 of the example unmanned aerial vehicle 10 of FIG. 1. In FIG. 8, the segmentation of several components can be seen. FIG. 9 is a front view 502 of the example unmanned aerial vehicle 10 of FIG. 1. FIG. 9 shows the chine and the angle of the fuselage 14. FIG. 10 is a left side view 504 of the example unmanned aerial vehicle 10 of FIG. 1. FIG. 11 is a segmented top down view 506 of the example unmanned aerial vehicle 10 of FIG. 1. FIG. 11 shows the segmentation of various components.

With the systems and methods discussed above, aerial surveillance can be performed on short notice with an unmanned aerial vehicle capable of being quickly launched to its operating altitude. The unmanned aerial vehicle can be equipped to monitor large areas, including spaces both above and below the unmanned aerial vehicle. In addition, the drop-away rocket used to launch the unmanned aerial vehicle can be recovered for reuse, thereby reducing costs associated with launching the unmanned aerial vehicle.

Further, the disclosure comprises examples according to the following clauses:

Clause 1: An unmanned aerial vehicle, comprising: an airframe including a fuselage and at least one stowable wing; a radar panel positioned on the fuselage such that the radar panel is angled downward and extends longitudinally along a ventral region of the fuselage; and a drop-away rocket engine that is configured to detachably mount to the airframe adjacent the radar panel.

Clause 2: The unmanned aerial vehicle of Clause 1, wherein the radar panel extends longitudinally from a location in front of the at least one stowable wing, through a location under the at least one stowable wing, to a location aft of the at least one stowable wing, when the at least one stowable wing is deployed.

Clause 3: The unmanned aerial vehicle of Clause 1 or 2, wherein the radar panel is an active electronically steered array.

Clause 4: The unmanned aerial vehicle of any of Clauses 1 to 3, wherein the radar panel is configured to transmit and receive X band microwave radio signals.

Clause 5: The unmanned aerial vehicle of any of Clauses 1 to 4, wherein the radar panel is mounted on a substantially planar section of the fuselage.

Clause 6: The unmanned aerial vehicle of any of Clauses 1 to 5, wherein the radar panel is a right radar panel, and the unmanned aerial vehicle further comprises a left radar panel that is symmetrically positioned on the fuselage.

Clause 7: The unmanned aerial vehicle of Clause 6, wherein the right radar panel is positioned on a right side of the fuselage such that the right radar panel is substantially parallel to a longitudinal axis of the fuselage, the right radar panel having a normal axis that is angled downward relative to horizontal and extends longitudinally from a location in front of a right wing of the at least one stowable wing, through a location under the right wing, to a location aft of the right wing, when the right wing is deployed; and the left radar panel is positioned on a left side of the fuselage such that the left radar panel is substantially parallel to the longitudinal axis of the fuselage, the left radar panel having a normal axis that is angled downward relative to horizontal and extends longitudinally from a location in front of a left wing of the at least one stowable wing, through a location under the left wing, to a location aft of the left wing, when the left wing is deployed.

Clause 8: The unmanned aerial vehicle of Clause 6 or 7, wherein the drop-away rocket engine is a first drop-away rocket engine, the unmanned aerial vehicle further comprising a second drop-away rocket engine that is configured to detachably mount to the airframe in a symmetrical location to the first drop-away rocket engine, adjacent to a second radar panel.

Clause 9: The unmanned aerial vehicle of any of Clauses 1 to 8, wherein respective rocket engine mounts are provided on the fuselage fore and aft of the radar panel, for detachably mounting the drop-away rocket engine.

Clause 10: The unmanned aerial vehicle of any of Clauses 1 to 9, wherein the at least one stowable wing is selected from the group consisting of a foldable wing, a scissor wing, and a retractable wing.

Clause 11: The unmanned aerial vehicle of any of Clauses 1 to 10, further comprising a sensor turret mounted on an upper side of the fuselage.

Clause 12: The unmanned aerial vehicle of Clause 11, wherein the sensor turret includes a shortwave infrared light sensor and/or a long wave infrared light sensor.

Clause 13: The unmanned aerial vehicle of any of Clauses 1 to 12, further comprising: a plurality of folding fins positioned in an aft section of the fuselage; and deployable landing skids respectively positioned on a forward section of the fuselage and in the aft section of the fuselage.

Clause 14: The unmanned aerial vehicle of any of Clauses 6 to 8, wherein: the fuselage includes, longitudinally in this order: a front section including a nose, a middle section, and an aft section including a plurality of folding fins; a lateral cross section of the middle section has a perimeter defined by right and left substantially planar sides that are oriented downwardly at symmetrical angles of declination and connected at respective top ends by a top side and at respective bottom ends by a bottom side; and the right radar panel is positioned on the right substantially planar side of the middle section and the left radar panel is positioned on the left substantially planar side of the middle section.

Clause 15: The unmanned aerial vehicle of any of Clauses 1 to 14, wherein the drop-away rocket engine is configured to provide thrust during launch, with the at least one stowable wing stowed, to launch the unmanned aerial vehicle, and to separate from the fuselage at a threshold altitude, and wherein the unmanned aerial vehicle is configured to deploy the at least one stowable wing to a deployed configuration after separation of the drop-away rocket engine and fly along a designated route at an operating altitude.

Clause 16: The unmanned aerial vehicle of Clause 15, wherein the radar panel is angled downward to face toward the horizon when the unmanned aerial vehicle is traveling at the operating altitude.

Clause 17: The unmanned aerial vehicle of any of Clauses 1 to 16, wherein, when drop-away rocket engine is mounted, a field of view of the radar panel is at least partially blocked, and when the drop-away rocket engine is jettisoned, the field of view of the radar panel is cleared.

Clause 18: A method for conducting aerial surveillance, comprising: providing an unmanned aerial vehicle including an airframe including a fuselage and at least one stowable wing, a radar panel positioned on the fuselage such that the radar panel is angled downward and extends longitudinally along a ventral region of the fuselage, and a drop-away rocket engine that is configured to detachably mount to the airframe adjacent the radar panel; launching the unmanned aerial vehicle under the power of the drop-away rocket engine, with the at least one stowable wing stowed; jettisoning the drop-away rocket engine at a predetermined separation altitude, thereby clearing a field of view of the radar panel; deploying the at least one stowable wing; flying along a designated route at an operating altitude; and performing radar surveillance using the radar panel while flying along the designated route.

Clause 19: An unmanned aerial vehicle, comprising: an airframe including a fuselage and at least one stowable wing, the fuselage having a middle section with right and left substantially planar regions oriented at an angle downward relative to horizontal; a right radar panel positioned in the right substantially planar region and a left radar panel positioned in the left substantially planar region such that each of the radar panels is angled downward; and a pair of drop-away rocket engines, each of which is configured to detachably mount to the airframe adjacent a respective one of the right and left radar panels.

Clause 20: The unmanned aerial vehicle of Clause 19, wherein each of the right and left radar panels is an active electronically steered array configured to transmit and receive X band microwave radio signals.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An unmanned aerial vehicle, comprising:
   an airframe including a fuselage and at least one stowable wing;
   a radar panel positioned on the fuselage such that the radar panel is angled downward and extends longitudinally along a ventral region of the fuselage; and
   a drop-away rocket engine that is detachably mounted to the airframe adjacent and outboard of the radar panel.

2. The unmanned aerial vehicle of claim 1, wherein the radar panel extends longitudinally from a location in front of the at least one stowable wing, through a location under the at least one stowable wing, to a location aft of the at least one stowable wing, when the at least one stowable wing is deployed.

3. The unmanned aerial vehicle of claim 1, wherein the radar panel is an active electronically steered array.

4. The unmanned aerial vehicle of claim 1, wherein the radar panel is configured to transmit and receive X band microwave radio signals.

5. The unmanned aerial vehicle of claim 1, wherein the radar panel is mounted on a substantially planar section of the fuselage.

6. The unmanned aerial vehicle of claim 1, wherein the radar panel is a right radar panel, and the unmanned aerial vehicle further comprises a left radar panel that is symmetrically positioned on the fuselage.

7. The unmanned aerial vehicle of claim 6, wherein
   the right radar panel is positioned on a right side of the fuselage such that the right radar panel is substantially parallel to a longitudinal axis of the fuselage, the right radar panel having a normal axis that is angled downward relative to horizontal and extends longitudinally from a location in front of a right wing of the at least one stowable wing, through a location under the right wing, to a location aft of the right wing, when the right wing is deployed; and
   the left radar panel is positioned on a left side of the fuselage such that the left radar panel is substantially parallel to the longitudinal axis of the fuselage, the left radar panel having a normal axis that is angled downward relative to horizontal and extends longitudinally from a location in front of a left wing of the at least one stowable wing, through a location under the left wing, to a location aft of the left wing, when the left wing is deployed.

8. The unmanned aerial vehicle of claim 6, wherein the drop-away rocket engine is a first drop-away rocket engine, the unmanned aerial vehicle further comprising a second drop-away rocket engine that is configured to detachably mount to the airframe in a symmetrical location to the first drop-away rocket engine, adjacent to a second radar panel.

9. The unmanned aerial vehicle of claim 1, wherein respective rocket engine mounts are provided on the fuselage fore and aft of the radar panel, for detachably mounting the drop-away rocket engine.

10. The unmanned aerial vehicle of claim 1, wherein the at least one stowable wing is selected from the group consisting of a foldable wing, a scissor wing, and a retractable wing.

11. The unmanned aerial vehicle of claim 1, further comprising a sensor turret mounted on an upper side of the fuselage.

12. The unmanned aerial vehicle of claim 11, wherein the sensor turret includes a shortwave infrared light sensor and/or a long wave infrared light sensor.

13. The unmanned aerial vehicle of claim 1, further comprising:
   a plurality of folding fins positioned in an aft section of the fuselage; and
   deployable landing skids respectively positioned on a forward section of the fuselage and in the aft section of the fuselage.

14. The unmanned aerial vehicle of claim 6, wherein:
   the fuselage includes, longitudinally in this order: a front section including a nose, a middle section, and an aft section including a plurality of folding fins;

a lateral cross section of the middle section has a perimeter defined by right and left substantially planar sides that are oriented downwardly at symmetrical angles of declination and connected at respective top ends by a top side and at respective bottom ends by a bottom side; and the right radar panel is positioned on the right substantially planar side of the middle section and the left radar panel is positioned on the left substantially planar side of the middle section.

15. The unmanned aerial vehicle of claim 1, wherein the drop-away rocket engine is configured to provide thrust during launch, with the at least one stowable wing stowed, to launch the unmanned aerial vehicle, and to separate from the fuselage at a threshold altitude, and wherein the unmanned aerial vehicle is configured to deploy the at least one stowable wing to a deployed configuration after separation of the drop-away rocket engine and fly along a designated route at an operating altitude.

16. The unmanned aerial vehicle of claim 15, wherein the radar panel is angled downward to face toward the horizon when the unmanned aerial vehicle is traveling at the operating altitude.

17. The unmanned aerial vehicle of claim 1, wherein, when drop-away rocket engine is mounted, a field of view of the radar panel is at least partially blocked, and when the drop-away rocket engine is jettisoned, the field of view of the radar panel is cleared.

18. A method for conducting aerial surveillance, comprising:

providing an unmanned aerial vehicle including an airframe including a fuselage and at least one stowable wing, a radar panel positioned on the fuselage such that the radar panel is angled downward and extends longitudinally along a ventral region of the fuselage, and a drop-away rocket engine that is detachably mounted to the airframe adjacent and outboard of the radar panel launching the unmanned aerial vehicle under the power of the drop-away rocket engine, with the at least one stowable wing stowed;

jettisoning the drop-away rocket engine at a predetermined separation altitude, thereby clearing a field of view of the radar panel;

deploying the at least one stowable wing;

flying along a designated route at an operating altitude; and performing radar surveillance using the radar panel while flying along the designated route.

19. An unmanned aerial vehicle, comprising:

an airframe including a fuselage and at least one stowable wing, the fuselage having a middle section with right and left substantially planar regions oriented at an angle downward relative to horizontal;

a right radar panel positioned in the right substantially planar region and a left radar panel positioned in the left substantially planar region such that each of the radar panels is angled downward; and a pair of drop-away rocket engines, each of which is detachably mounted to the airframe adjacent and outboard of a respective one of the right and left radar panels.

20. The unmanned aerial vehicle of claim 19, wherein each of the right and left radar panels is an active electronically steered array configured to transmit and receive X band microwave radio signals.

* * * * *